March 5, 1935.  J. PATERSON ET AL  1,993,454
CHANGE SPEED GEAR
Filed Nov. 23, 1933  3 Sheets-Sheet 1

INVENTORS
James Paterson,
Joseph H. Paterson,
By John B. Brady
ATTORNEY

March 5, 1935.  J. PATERSON ET AL  1,993,454
CHANGE SPEED GEAR
Filed Nov. 23, 1933  3 Sheets-Sheet 2

INVENTORS
James Paterson,
Joseph H. Paterson,
by John B. Brady
ATTORNEY

March 5, 1935.  J. PATERSON ET AL  1,993,454

CHANGE SPEED GEAR

Filed Nov. 23, 1933   3 Sheets-Sheet 3

INVENTORS
James Paterson,
Joseph H. Paterson,
by John O. Brady
ATTORNEY

Patented Mar. 5, 1935

1,993,454

UNITED STATES PATENT OFFICE 1,993,454

CHANGE SPEED GEAR

James Paterson and Joseph Howard Paterson, Brighton, England, assignors to J. P. Self Change Gear Company Limited, London, England Application November 23, 1933, Serial No. 699,432
In Great Britain December 1, 1932

27 Claims. (Cl. 74—336.5)

This invention relates to change speed gears enabling the automatic engagement of gear wheels (affording a ratio appropriate to the prevailing relations of the driving energy and driven load) at a time when the engaging parts of the said gear wheels are rotating at synchronous peripheral speeds, of the kind having two governors, one of which is driven at a rotational speed which is a constant proportion of the speed of the driving member and the other of which is driven at a rotational speed which is a constant proportion of the speed of the driven member, and provides in combination therewith a distributor controlled by the two governors jointly and thereby movable two-dimensionally to render gear-changing mechanism effective, or to permit the actuation of such mechanism, to cause the engagement of gear wheels providing the appropriate speed ratio when the peripheral speeds of the engaging parts of the said gear wheels have attained substantial synchronism.

The distributor may comprise an electrical contact movable under the joint control of the governors over a surface having a plurality of exposed electrical conductors for selectively energizing electrical relays, each of the conductors being in circuit with one of the relays and lying in the locus of the movable contact at the relative speed of the governors corresponding to the gear ratio engageable upon energization of the said one of the relays.

The electromagnetic relays disposed in circuit with the movable contact and the exposed conductors on the surface aforesaid may be comprised in the gear changing mechanism for effecting the operation thereof.

Pre-selection of the appropriate gear ratio may be effected by a remote control device. When the gear comprises electromagnetic relays, a pre-selector device may consist of an electrical switch actuable to bridge a pair of contacts in any one of the relay circuits and thereby select the gear ratio to be engaged. Preferably, in a motor car, branches of the said circuits are led to pairs of contacts located on a dial, scale or the like adjacent the steering wheel of the vehicle, a lever movable over the said dial, scale or the like having a part serving to bridge one at a time the said pairs of contacts. The movement of the lever may alternatively be transmitted mechanically to actuate a slider movable over each in turn of a number of pairs of contacts which are separately associated with the several circuits of the electromagnetic gear-engaging relays and disposed adjacent the said relays.

Two embodiments of the invention will be described by way of example with reference to the accompanying drawings, wherein:—

Figure 1:
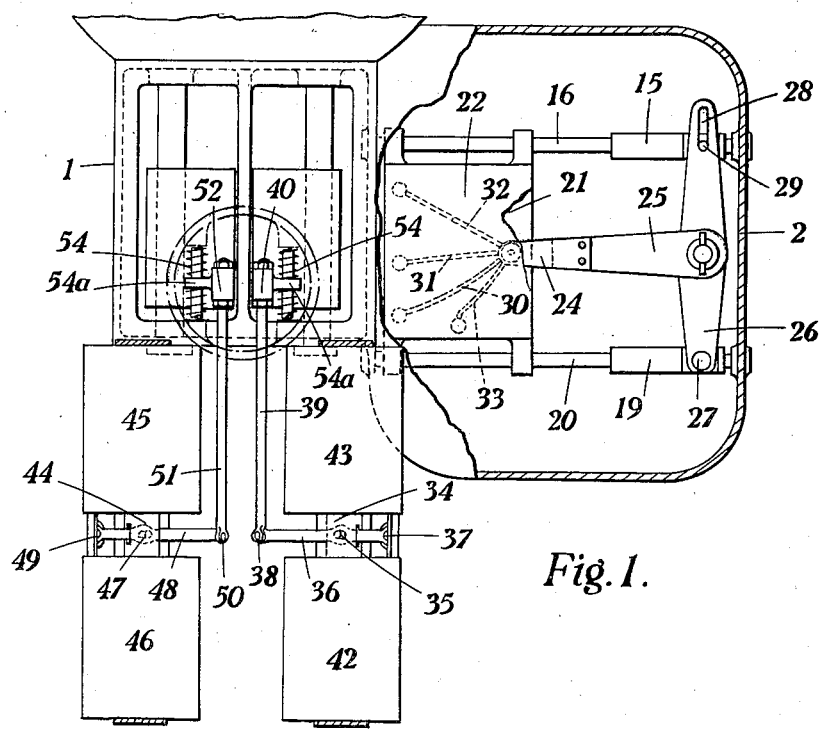
Fig. 1 is a plan of a change speed gear according to the invention, as applied to a motor vehicle.

The gear box 1 shown in the drawings houses spur gear wheels affording three forward speed ratios and one reverse speed ratio in known manner. A lateral extension 2 of the box houses two independent centrifugal governors 3 and 4, the governor 3 being driven through bevel or other gears 5 and a spur wheel 6 from a spur wheel 7, mounted on a lay shaft 8 and in constant mesh with a driving spur wheel (not shown) mounted on a clutch shaft (not shown) so that the speed of rotation of the governor 3 is a constant proportion of the speed of the clutch shaft. The governor 4 is driven through bevel or other wheels 9 and a spur wheel 10 in mesh with a spur gear 11 mounted on the splined driven shaft 12 of the gear box, so that the speed of rotation of the governor 4 is a constant proportion of the speed of the driven shaft 12. The sliding collar 13 of the governor 3 is engaged by a forked arm 14 extending from a sleeve 15 slidable on a rod 16 parallel to the axis of the governor 3. Similarly the sliding collar 17 of the governor 4 is engaged by a forked arm 18 extending from a sleeve 19 slidable on a rod 20 parallel to the axis of the governor 4. The rods 16 and 20 support a pair of insulating plates 21, 22 between which is movable a distributor member comprising a pair of blades with ball contacts 23 and 24 pressing respectively downwards and upwards against the surfaces of the plates 21 and 22. The blades 23 and 24 are securely mounted upon an arm 25 which is fixed to a cross member 26 to form a triangular or T-lever having a pivotal connection 27 with the sleeve 19 and having a slot 28 into which projects a pin 29 on the sleeve 15. The plate 21 has three inset, exposed conductive strips 30, 31 and 32, while the upper plate 22 has a single inset conductive strip 33.

Figure 2:
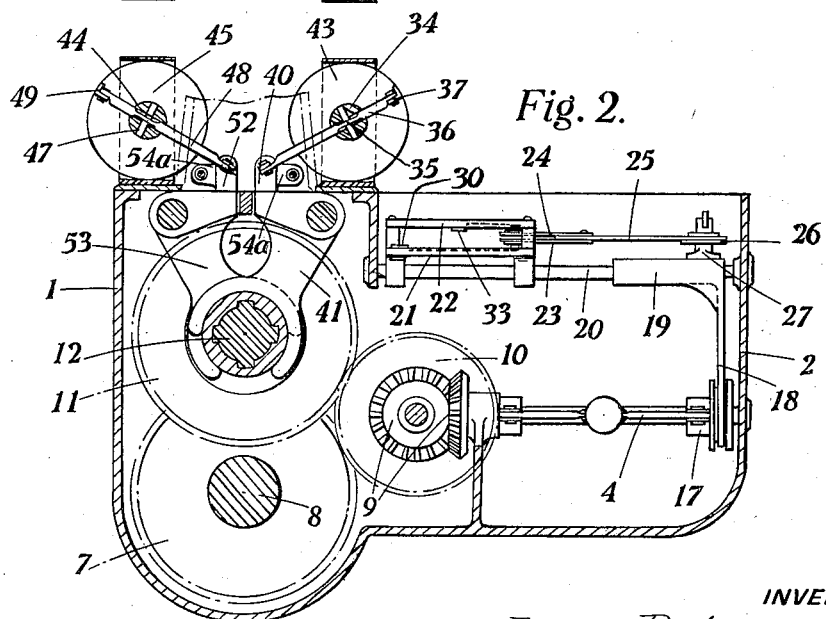
Fig. 2 is a sectional transverse view of the gear.

Above the gear box as shown in Figs. 1 and 2 there are mounted four electromagnetic solenoids in tandem pairs working on common armatures. The armature 34 is pivotally connected at 35 with a lever 36 mounted on a fixed pivot 37, the free end 38 of the lever being pivotally connected to a rod 39 engaging an upward projection 40 on a striker fork 41. The solenoid 42 when energized attracts the armature 34 and by the consequent movement of the lever 36, the rod 39 and the striker fork 41 effects the engagement of the first speed ratio. The solenoid 43 which also acts on the armature 34 when it is energized effects through the consequent movement of the lever 36, the rod 39 and the fork 41 the engagement of reverse gear. Similarly, an armature 44 common to solenoids 45 and 46 is pivotally connected at 47 with a lever 48 mounted on a fixed pivot 49, and having its free end pivotally connected at 50 to a rod 51 which engages an upward projection 52 on a striker fork 53. When the solenoid 45 is energized, the consequent movement of the lever 48, the rod 51 and the fork 53 effects the engagement of second gear, while the opposite movement of the said lever 48, rod 51 and fork 53 on the energization of the solenoid 46 effects the engagement of top gear. Compression springs 54 mounted between ears 54a on the projections 40 and 52 and fixed abutments above the gear box 1 tend to restore the striker forks 41 and 53 and the armatures 34 and 44, through the linkages 36, 39 and 48, 51 respectively, to their neutral positions.

Figure 4:
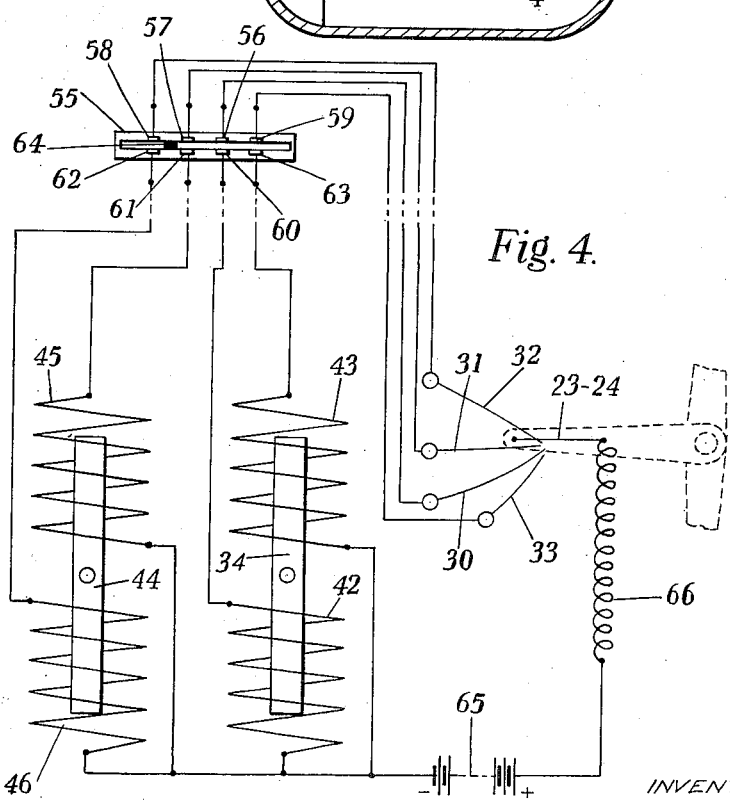
Fig. 4 is an electrical circuit diagram of the automatic gear changing means.

An electrical circuit affording the selective energization of the solenoids 42, 43, 45 and 46 through the contact member 23—24 and the conductive path 30—33, and also through a remote selector switch 55, is shown in Fig. 4. The conductive strips 30—33 are respectively connected to contacts 56—59 at the switch 55, and the windings of the solenoids 42, 43, 45 and 46 are respectively connected to contacts 60—63 disposed opposite the contacts 56—59. The switch 55 includes a member 64 slidable to bridge any one of the pairs of contacts 56 and 60, 57 and 61, 58 and 62 or 59 and 63 at will. The windings of the solenoids are also jointly connected to the negative terminal of a battery 65, the positive terminal of which is connected to the contacts 23 and 24 by a flexible lead 66.

The operation of the gear changing means as aforesaid is simple. When the motor vehicle is standing still with its engine running the governor 4 geared to the driven shaft 12 is stationary while the governor 3 geared to the clutch shaft is rotating. To start the vehicle the engine is momentarily accelerated in neutral, which has the effect of so speeding up the governor 3 that the sleeve 15 moves along the rod 16, and, through the pin-and-slot connection 28, 29, turns the lever 26 about the pivot 27, the consequent movement of the arm 25 forcing the contact 23 over to the area of the insulating plate 21 outside the conductive path 30 in the circuit of the first gear solenoid 42. The slider 64 of the switch 55 is then moved to bridge the contacts 56 and 60 in the same circuit, whereafter the clutch pedal is depressed, to disengage the clutch and allow its shaft to lose speed. Consequently, the governor 3 also loses speed, and urges the sleeve 15 back along the rod 16, moving the lever 26 and the arm 25 back towards the position shown in Fig. 1, whereupon the contact 23 eventually rides upon the conductive strip 30, and closes the circuit of the solenoid 42 which, being energized, attracts the armature 34 and engages first gear through the linkage above referred to. The clutch pedal may subsequently be released to engage the clutch and cause the vehicle to move forward in first gear. Immediately thereafter the slider 64 is moved to bridge the contacts 57 and 61, breaking the circuit of the solenoid 42, and preparing the circuit of the second gear solenoid 46 for completion by the contact 23 when second gear is required. So long as first gear remains engaged the governors 3 and 4 rotate at the fixed relative speed, and the contact 23 follows a path determined by this relative speed, which path is coincident with the conductive strip 30. When it is required to change up to second gear, the clutch pedal is depressed. Owing to the inertia of the vehicle, the governor 4 tends to retain its speed of rotation so that the sleeve 19 is held at least substantially in the position on the rod 20 which it attains during the engagement of first gear, so that the falling off in speed of the governor 3 immediately consequent on the disengagement of the clutch swings the contact 23 into the area on the insulating plate 21 between the conductive paths 30 and 31. When the speed of the governor 3 has fallen to the requisite degree the contact 23 rides upon the strip 31, and the solenoid 45 is energized to engage the second gear through the linkage 48, 51 and the striker fork 53. A similar procedure is followed for the engagement of top gear, the slider 64 being moved to bridge the contacts 58 and 62, and the circuit of the top gear solenoid 45 being eventually completed by the contact 23 on depression of the clutch pedal.

A similar series of operations is effected when a downward change is required, except that it is necessary to follow the common practice of accelerating the clutch shaft, so that the change in the relative speeds of the two governors moves the contact 23 across the area of the insulating plate 21 between the conductive strip corresponding to the higher gear previously in engagement and the strip corresponding to the lower gear which it is desired to engage, until the said contact rides upon the latter strip to effect the engagement of the said lower gear.

Since reverse gear is usually engaged when the vehicle is at rest, the end of its conductive strip 33 corresponding to the lower speed range of the vehicle in reverse substantially coincides with the end of the first gear strip 30. For convenience, the strip 33 is therefore set in the upper insulating plate 22, the circuit of the reverse gear solenoid 43 being completed through the said strip 33 and the upper contact 24 on the arm 25 by a series of operations similar to those described above for engaging first gear.

Figure 3:
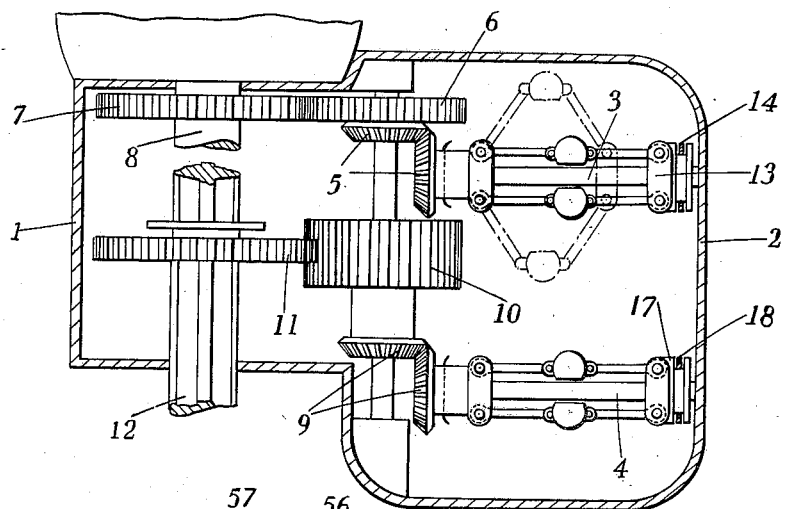
Fig. 3 is a sectional plan view showing the interior of the gear.
Figure 5:
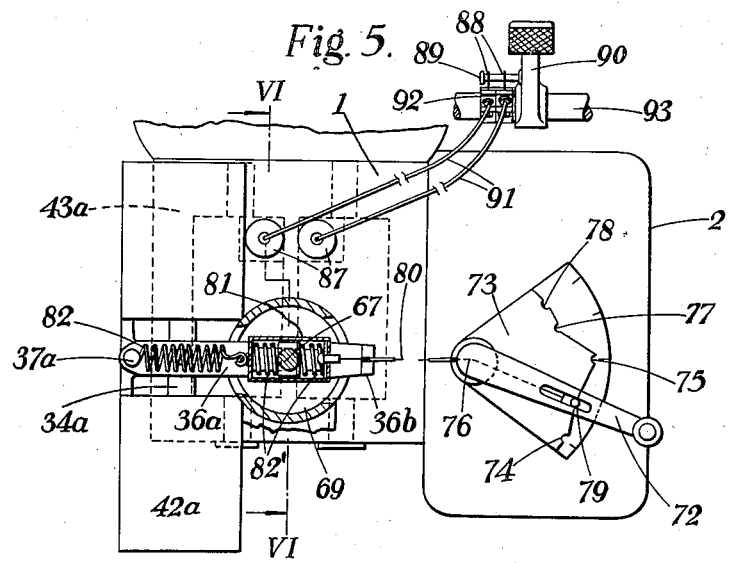
Fig. 5 is a partly sectional plan view of a modification.
Figure 6:
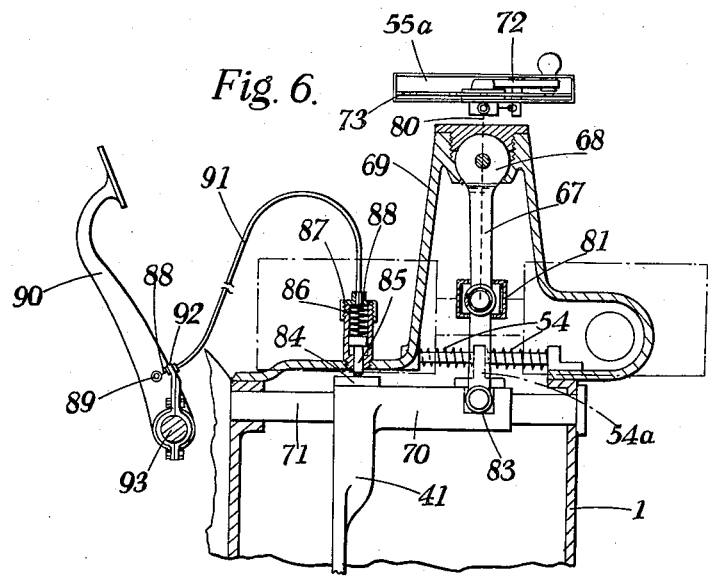
Fig. 6 is a sectional elevation on the line 6—6 of Fig. 5.

In the modification shown in Figs. 5 and 6, a single pair of solenoids actuating one armature serve for the selective engagement of three forward speed ratios and a reverse ratio. The modification includes the governors 3 and 4 controlling contacts 23—24 which co-operate with conductive strips 30—33, exactly as shown in Figs. 1-3. However, the electrical circuit illustrated in Fig. 4 is modified, the contacts 60 and 62 in the switch 55 both being connected to the winding of a solenoid 42a, and the contacts 61 and 63 both being connected to the winding of a solenoid 43a. These two solenoids act through an armature 34a upon a pivoted lever 36a which effects engagement of the four gears through an arm 67 the upper end of which is supported by a ball joint 68 in an upward extension 69 of the gear box cover. The gears are engaged by striker forks 53 and 41 as before, the forks being integral with two like sleeves 70 slidable on two rods 71 supported towards the top of the gear box 1. The switch 55 is comprised in a quadrant 55a round which the slider 64 is moved by a lever 72. The quadrant 55a also comprises a cam piece 73, having two notches 74 and 75 corresponding respectively to reverse and first gear positions of the slider 64 disposed at the same distance from the pivotal axis 76 of the arm 72, which distance is greater than that by which two further notches 77 and 78, corresponding respectively to second and top gear positions of the slider 64, are displaced from the axis 76. In addition to the slider 64, the arm 72 also carries a tappet 79 which engages one of the said notches according to the position of the arm 72 and is connected by the inner cable of a Bowden mechanism 80 to a yoke 81 slidable upon the lever 36a. This yoke 81 is pulled towards the pivot 37a of the arm 36a by a spring 82, against the action of the Bowden wire 80, the outer casing of which has fixed abutments at the axis 76 of the quadrant 73 and at the end 36b of the lever 36a. The depending arm 67, which passes through a longitudinal slot in the lever 36a, is also embraced by the yoke 81 and is resiliently maintained at or about the middle of the said yoke by a pair of oppositely acting compression springs 82'. Thus, when the arm 72 is moved to bridge the contacts 56 and 60 or the contacts 59 and 63, the tappet 79 engaging the notch 75 or the notch 74 pulls the yoke 81 by means of the Bowden cable until the depending arm 67 is resiliently pressed into a recess 83 in the sleeve 70 supporting the fork 41. Then, if the solenoid 42a is energized, as hereinbefore described, the consequent movement of the arm 36a effects the engagement of first gear by the fork 41 through the depending arm 67, while if the solenoid 43a is energized the fork 41 is moved by the lever 36a through the depending arm 67 to engage reverse gear. When the lever 72 is moved on to bridge the contacts 57 and 61 or 58 and 62, the tappet 79 moves down into engagement with the notch 77 or the notch 78, in either case releasing the inner cable of the Bowden mechanism 80 to an equal extent and permitting the spring 82 to pull the yoke 81 towards the pivot 37a of the lever 36a, so that the depending arm 67 is resiliently pressed into a notch, in the sleeve supporting the striker fork 53, which corresponds to the notch 83 in the sleeve supporting the fork 41. Thus, with the lever 72 in such position that the contacts 57 and 61 are bridged by the slider 64 and the tappet 79 is in the notch 77, the solenoid 43a may be energized as above described, and the consequent movement of the armature 34a and the lever 36a serves through the depending arm 67 to shift the fork 53 and engage second gear. Similarly, when the lever 72 is in such position that the contacts 58 and 62 are bridged by the slider 64 and the tappet 79 is engaged by the notch 78, energization of the solenoid 42a in the manner above described effects the engagement of top gear through the lever 36a, the depending arm 67 and the fork 53. Means are, of course, provided in the gear box for preventing the movement of the arm 67 across from the recess 83 to the corresponding recess in the sleeve supporting the striker fork 53 except at the neutral position, so that there is no possibility of two gears being engaged accidentally at the same time.

Figs. 5 and 6 also show a further detail feature of the invention, for maintaining a selected gear in engagement until the clutch pedal is depressed for changing gear. Springs 54 are provided which abut ears 54a on the sleeves 70 and tend to return the striker forks 41 and 53 to neutral position. To retain the said forks in gear engagement positions each of them has an upwardly projecting lug 84 co-operating with a detent 85 pressed upon it by a spring 86, the said detents and springs being housed in two cylindrical members 87 mounted on the cover of the gear box.

Each of the detents 85 is connected by the inner cable 88 of a Bowden mechanism with a laterally extending arm 89 on the clutch pedal 90, while the outer casing 91 of each mechanism abuts the top of the housing member 87 and a fixed stop 92 secured about or adjacent the pivot 93 of the clutch pedal 90. With the forks 41 and 53 in their neutral positions, the detents 85 ride upon the middles of the projections 84 on the fork carrying sleeves, but when the clutch pedal 90 is depressed for the engagement of a gear ratio the detents 85 are lifted. The actuated fork being moved in one direction or the other to engage the required gear, on the subsequent release of the pedal 90 the detent 85 co-operating with the fork which has been moved falls to one side or the other of the projection 84 thereon and retains the said fork in its new position to keep the gears affording the selected ratio engaged, despite the pressure of the springs 54. Subsequently, when the pedal 90 is depressed in the course of engaging another gear the lifting of the detent 85 allows the springs 54 to restore the previously displaced fork to its neutral position.

In carrying out the invention it is possible to make numerous modifications without departing from the principle. For example, the pre-selector switch 55 may be dispensed with, the conductive strips 30, 31, 32 and 33 being connected directly to the windings of the solenoids 42, 45, 46 and 43 respectively, and the operations of gear changing being effected entirely by appropriate actuation of the clutch, accelerator and brake controls. In such case some form of indication, for example, the automatic illumination of differently coloured or positioned lamps interpolated in each of the connections from the strips to the windings, may be provided to show which gear is engaged.

The gear changing means according to the invention may be manufactured as a unit with a gear box. Alternatively, it may be manufactured separately as an attachment to be substituted for the normal gear change lever or other means in any particular type of motor car, since it is only necessary to take positive drives for the governors from the clutch and propeller shafts of the gear box, and to connect the gear striking means by suitable linkage to the armatures of the solenoids; with most gear boxes in common use these modifications can easily and cheaply be effected after the removal of the existing gear change lever or part of the said lever, and/or other means.

We claim:

1. The combination, with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, a plurality of electrical relays associated with the gear-engaging means, a fixed surface comprising a plurality of exposed electrical conductors, and a distributor comprising an electrical contact movable two-dimensionally over said surface under the joint control of the two governors, each of the conductors being in circuit with one of the relays and lying in the locus of the movable contact at the relative speed of the governors corresponding to the gear ratio engageable upon energization of the said one of the relays.

2. The combination with a change speed gear having a driving member, a driven member, a plurality of gear trains affording different speed ratios between said members, and striker means for said gear trains, of a governor driven at a rotational speed which is a constant proportion of the speed of the driving member, another governor driven at a rotational speed which is a constant proportion of the speed of the driven member, a plurality of electrical relays mechanically connected to the striker means, a fixed surface comprising a plurality of exposed electrical conductors, and a distributor comprising an electrical contact movable two-dimensionally over said surface under the joint control of the two governors, each of the conductors being in circuit with one of the relays and lying in the locus of the movable contact at the relative speed of the governors corresponding to the gear ratio engageable upon energization of the said one of the relays.

3. The combination, with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, a plurality of electrical relays associated with the gear engaging means, a surface comprising a plurality of exposed electrical conductors, a distributor comprising an electrical contact movable over said surface under the joint control of the two governors, and a pre-selector device consisting of a plurality of pairs of contacts associated with an electrical switch actuable to bridge said pairs of contacts one at a time, each of the pairs of contacts being connected respectively to the winding of one of the relays and to one of the conductors, which lies in the locus of the movable contact at the relative speed of the governors corresponding to the gear ratio engageable upon energization of the said one of the relays.

4. The combination, with a change speed gear having a driving member, a driven member, a plurality of gear trains affording different speed ratios between said members, and striker means for said gear trains, of a governor driven at a rotational speed which is a constant proportion of the speed of the driving member, another governor driven at a rotational speed which is a constant proportion of the speed of the driven member, a plurality of electrical relays mechanically connected to the striker means, a surface comprising a plurality of exposed electrical conductors, a distributor comprising an electrical contact movable over said surface under the joint control of the two governors, and a pre-selector device consisting of a plurality of pairs of contacts associated with an electrical switch actuable to bridge said pairs of contacts one at a time, each of the pairs of contacts being connected respectively to the winding of one of the relays and to one of the conductors, which lies in the locus of the movable contact at the relative speed of the governors corresponding to the gear ratio engageable upon energization of the said one of the relays.

5. The combination, with a change speed gear having a driving member, a driven member, a plurality of gear trains affording different speed ratios between said members, means selectively engaging said gear trains one at a time, and a clutch disengageable to free the driving member from driving torque, of a governor driven at a rotational speed which is a constant proportion of the speed of the driving member, another governor driven at a rotational speed which is a constant proportion of the speed of the driven member, a distributor movable two-dimensionally by the two governors jointly and selectively actuating said gear-engaging means, and means maintaining any gear engaged, said last mentioned means being releasable on the disengagement of the clutch.

6. The combination, with a change speed gear having a driving member, a driven member, a plurality of gear trains affording different speed ratios between said members, striker means for said gear trains, and a clutch disengageable to free the driving member from driving torque, of a governor driven at a rotational speed which is a constant proportion of the speed of the driving member, another governor driven at a rotational speed which is a constant proportion of the speed of the driven member, a plurality of electrical relays mechanically connected to the striker means, a surface comprising a plurality of exposed electrical conductors, a distributor comprising an electrical contact movable over said surface under the joint control of the two governors, each of the conductors being in circuit with one of the relays and lying in the locus of the movable contact at the relative speed of the governors corresponding to the gear ratio engageable upon energization of the said one of the relays, and means maintaining any gear engaged, said last mentioned means being releasable on the disengagement of the clutch.

7. The combination, with a change speed gear having a driving member, a driven member, a plurality of gear trains affording different speed ratios between said members, means selectively engaging said gear trains one at a time, a clutch associated with the driving member and lever means operable to disengage the clutch and free the driving member from driving torque, of a governor driven at a rotational speed which is a constant proportion of the speed of the driving member, another governor driven at a rotational speed which is a constant proportion of the speed of the driven member, a plurality of electrical relays associated with the gear engaging means, a surface comprising a plurality of exposed electrical conductors, a distributor comprising an electrical contact movable over said surface under the joint control of the two governors, a pre-selector device consisting of a plurality of pairs of contacts and an electrical switch actuable to bridge said pairs of contacts one at a time, each of the pairs of contacts being connected respectively to the winding of one of the relays and to one of the conductors, which lies in the locus of the movable contact at the relative speed of the governors corresponding to the gear ratio engageable upon energization of the said one of the relays, and means maintaining any gear engaged, said last mentioned means being releasable on the actuation of said lever means.

8. The combination, with a change speed gear having a driving member, a driven member, a plurality of gear trains affording different speed ratios between said members, striker means for said gear trains, a clutch associated with the driving member and lever means operable to disengage the clutch and free the driving member from driving torque, of a governor driven at a rotational speed which is a constant proportion of the speed of the driving member, another governor driven at a rotational speed which is a constant proportion of the speed of the driven member, a plurality of electrical relays mechanically connected to the striker means, a surface comprising a plurality of exposed electrical conductors, a distributor comprising an electrical contact movable over said surface under the joint control of the two governors, a pre-selector device consisting of a plurality of pairs of contacts and an electrical switch actuable to bridge said pairs of contacts one at a time, each of the pairs of contacts being connected respectively to the winding of one of the relays and to one of the conductors, which lies in the locus of the movable contact at the relative speed of the governors corresponding to the gear ratio engageable upon energization of the said one of the relays, abutments on the striker means, resilient means urging the striker means to neutral position, detents co-operating with the abutments, and linkage means connecting the detents with the lever means, said lever means on operation serving to disengage the detents from the abutments.

9. The combination, with a change speed gear having a driving member, a driven member, a plurality of gear trains affording different speed ratios between said members, a plurality of slidable gear striker forks, and a lever universally pivoted and movable selectively to slide one of said forks and engage one of said gear trains, of a governor driven at a rotational speed which is a constant proportion of the speed of the driving member, another governor driven at a rotational speed which is a constant proportion of the speed of the driven member, a distributor movable two-dimensionally by the two governors jointly, a plurality of means selectively energizable by said distributor for actuating said lever, pre-selector means disposed between said distributor and said lever actuating means determining the gear ratio to be engaged, and means operable with said pre-selector means determining the engagement of said lever with the appropriate striker fork.

10. The combination with a change speed gear having a driving member, a driven member, a plurality of gear trains affording different speed ratios between said members, a plurality of slidable gear striker forks, and a lever universally pivoted and movable selectively to slide one of said forks and engage one of said gear trains, of a governor driven at a rotational speed which is a constant proportion of the speed of the driving member, another governor driven at a rotational speed which is a constant proportion of the speed of the driven member, a plurality of electrical relays associated with the lever, a surface comprising a plurality of exposed electrical conductors, a distributor comprising an electrical contact movable two dimensionally over said surface under the joint control of the two governors, each of the conductors being in circuit with one of the relays and lying in the locus of the movable contact at the relative speed of the governors corresponding to the gear ratio engageable upon energization of the said one of the relays, and means determining the engagement of the lever with a selected one of the striker forks.

11. The combination, with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, a plurality of electrical solenoids having their armatures connected with the gear-engaging means, a fixed surface comprising a plurality of exposed electrical conductors, and a distributor comprising an electrical contact movable two-dimensionally over said surface under the joint control of the two governors, each of the conductors being in circuit with the winding of one of the solenoids and lying in the locus of the movable contact at the relative speed of the governors corresponding to the gear ratio engaged by energization of the said one of the solenoids.

12. The combination, with a change speed gear having a driving member, a driven member, a plurality of gear trains affording different speed ratios between said members, and striker means for said gear trains, of a governor driven at a rotational speed which is a constant proportion of the speed of the driving member, another governor driven at a rotational speed which is a constant proportion of the speed of the driven member, a plurality of electrical solenoids having their armatures mechanically connected to the striker means, a fixed surface comprising a plurality of exposed electrical conductors, and a distributor comprising an electrical contact movable two dimensionally over said surface under the joint control of the two governors, each of the conductors being in circuit with the winding of one of the solenoids and lying in the locus of the movable contact at the relative speed of the governors corresponding to the gear ratio engaged by energization of the said one of the solenoids.

13. The combination, with a change speed gear having a driving member, a driven member, a plurality of gear trains affording different speed ratios between said members, and means serving to engage said gear trains one at a time, of a governor driven at a rotational speed which is a constant proportion of the speed of the driving member, another governor driven at a rotational speed which is a constant proportion of the speed of the driven member, a plurality of electrical solenoids associated with said gear engaging means, a distributor movable two-dimensionally by the two governors jointly energizing the windings of said solenoids one at a time, and pre-selector means in circuit with the distributor and the solenoids determining the solenoid winding to be energized.

14. The combination, with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, a plurality of electrical solenoids having their armatures connected with the gear engaging means, a surface comprising a plurality of exposed electrical conductors, a distributor comprising an electrical contact movable over said surface under the joint control of the two governors, and a pre-selector device consisting of a plurality of pairs of contacts and an electrical switch actuable to bridge said pairs of contacts one at a time, each of the pairs of contacts being connected respectively to the winding of one of the solenoids and to one of the conductors, which lies in the locus of the movable contact at the relative speed of the governors corresponding to the gear ratio engaged by energization of the said one of the solenoids.

15. The combination, with a change speed gear having a driving member, a driven member, a plurality of gear trains affording four speed ratios between said members, and two striker forks each slidable in two directions to engage one or another of said gear trains, of a governor driven at a rotational speed which is a constant proportion of the speed of the driving member, another governor driven at a rotational speed which is a constant proportion of the speed of the driven member, four electrical solenoids disposed in two tandem pairs, each pair having a common armature mechanically connected to one of the striker forks, a surface comprising four exposed electrical conductors, a distributor comprising an electrical contact movable over said surface under the joint control of the two governors, and a pre-selector device consisting of four pairs of contacts and an electrical switch actuable to bridge said pairs of contacts one at a time, each of the pairs of contacts being connected respectively to the winding of one of the solenoids and to one of the conductors, which lies in the locus of the movable contact at the relative speed of the governors corresponding to the gear ratio engaged by energization of the said one of the solenoids.

16. The combination, with a change speed gear having a driving member, a driven member, a plurality of gear trains affording different speed ratios between said members, means serving to engage said gear trains one at a time, and a clutch disengageable to free the driving member from driving torque, of a governor driven at a rotational speed which is a constant proportion of the speed of the driving member, another governor driven at a rotational speed which is a constant proportion of the speed of the driven member, a plurality of electrical solenoids associated with said gear engaging means, a single distributor controlled jointly by the two governors and selectively energizing said solenoids, and means maintaining any gear engaged, said last mentioned means being releasable on the disengagement of the clutch.

17. The combination, with a change speed gear having a driving member, a driven member, a plurality of gear trains affording different speed ratios between said members, striker means for said gear trains, and a clutch disengageable to free the driving member from driving torque, of a governor driven at a rotational speed which is a constant proportion of the speed of the driving member, another governor driven at a rotational speed which is a constant proportion of the speed of the driven member, a plurality of electrical solenoids having their armatures mechanically connected to the striker means, a surface comprising a plurality of exposed electrical conductors, a distributor comprising an electrical contact movable two dimensionally over said surface under the joint control of the two governors, each of the conductors being in circuit with the winding of one of the solenoids and lying in the locus of the movable contact at the relative speed of the governors corresponding to the gear ratio engaged by energization of the said one of the relays, and means maintaining any gear engaged, said last mentioned means being releasable on the disengagement of the clutch.

18. The combination, with a change speed gear having a driving member, a driven member, a plurality of gear trains affording different speed ratios between said members, means selectively engaging said gear trains one at a time, a clutch associated with the driving member and lever means operable to disengage the clutch and free the driving member from driving torque, of a governor driven at a rotational speed which is a constant proportion of the speed of the driving member, another governor driven at a rotational speed which is a constant proportion of the speed of the driven member, a plurality of electrical solenoids having their armatures connected with the gear engaging means, a surface comprising a plurality of exposed electrical conductors, a distributor comprising an electrical contact movable over said surface under the joint control of the two governors, a pre-selector device consisting of a plurality of pairs of contacts and an electrical switch actuable to bridge said pairs of contacts one at a time, each of the pairs of contacts being connected respectively to the winding of one of the solenoids and to one of the conductors, which lies in the locus of the movable contact at the relative speed of the governors corresponding to the gear ratio engaged by energization of the said one of the solenoids, and means maintaining any gear engaged, said last mentioned means being releasable on the actuation of said lever means.

19. The combination, with a change speed gear having a driving member, a driven member, a plurality of gear trains affording four speed ratios between said members, two striker forks each slidable in two directions to engage one or another of said gear trains, a clutch associated with the driving member, and lever means operable to disengage the clutch and free the driving member from driving torque, of a governor driven at a rotational speed which is a constant proportion of the speed of the driving member, another governor driven at a rotational speed which is a constant proportion of the speed of the driven member, four electrical solenoids disposed in two tandem pairs, each pair having a common armature mechanically connected to one of the striker forks, a surface comprising four exposed electrical conductors, a distributor comprising an electrical contact movable over said surface under the joint control of the two governors, a pre-selector device consisting of four pairs of contacts and an electrical switch actuable to bridge said pairs of contacts one at a time, each of the pairs of contacts being connected respectively to the winding of one of the solenoids and to one of the conductors, which lies in the locus of the movable contact at the relative speed of the governors corresponding to the gear ratio engaged by energization of the said one of the relays, abutments on the striker forks, resilient means urging the striker forks to neutral positions, detents co-operating with the abutments, and linkage means connecting the detents with the lever means, said lever means on operation serving to disengage the detents from the abutments.

20. The combination, with a change speed gear having a driving member, a driven member, a plurality of gear trains affording different speed ratios between said members, a plurality of slidable gear striker forks, and a lever universally pivoted and movable selectively to slide any one of said forks and so engage any one of said gear trains, of a governor driven at a rotational speed which is a constant proportion of the speed of the driving member, another governor driven at a rotational speed which is a constant proportion of the speed of the driven member, a plurality of electrical solenoids associated with said lever, a single distributor controlled by the two governors jointly for selectively energizing said solenoids one at a time to actuate said lever, pre-selector means in circuit with said solenoids and said distributor determining the solenoid winding to be energized and means operable with said pre-selector means determining the engagement of said lever with the appropriate striker fork.

21. The combination, with a change speed gear having a driving member, a driven member, a plurality of gear trains affording different speed ratios between said members, a plurality of slidable gear striker forks and a lever universally pivoted and movable selectively to slide one of said forks and engage one of said gear trains, of a governor driven at a rotational speed which is a constant proportion of the speed of the driving member, another governor driven at a rotational speed which is a constant proportion of the speed of the driven member, a tandem pair of electrical solenoids having a common armature connected with the lever, a surface comprising a plurality of exposed electrical conductors, a distributor comprising an electrical contact movable over said surface under the joint control of the two governors, and means determining the engagement of the lever with a selected one of the striker forks, some of the conductors being in parallel in circuit with the winding of one of the solenoids and lying in the loci of the movable contact at the relative speeds of the governors corresponding to the gear ratios engageable upon energization of the said one of the solenoids under the selective engagement of the lever with the striker forks, and the remaining conductors being in parallel in circuit with the winding of the other solenoid and lying in the loci of the movable contact at the relative speeds of the governors corresponding to the gear ratios engageable upon energization of the said other solenoid under the selective engagement of the lever with the striker forks.

22. The combination, with a change speed gear having a driving member, a driven member, a plurality of gear trains affording different speed ratios between said members, and means selectively engaging said gear trains one at a time, of a centrifugal governor driven at a rotational speed which is a constant proportion of the speed of the driving member, another governor driven at a rotational speed which is a constant proportion of the speed of the driven member, said governors being disposed for rotation about parallel axes and each actuating a collar slidable on its axis, a cross link articulated to the sliding collars of said governors, and an arm extending angularly from said cross link and carrying a member movable two-dimensionally by said arm to enable engagement by said engaging means of that gear train which affords the appropriate ratio when the peripheral speeds of the engaging parts of said gear train attain substantial synchronism.

23. The combination, with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, said governors being disposed for rotation about parallel axes and each actuating a collar slidable on its axis, a plurality of electrical relays associated with the gear engaging means, a surface comprising a plurality of exposed electrical conductors, a cross link articulated to the sliding collars of said governors, and an arm extending angularly from said cross link and carrying a distributor movable two-dimensionally over said surface by said arm, each of the conductors being in circuit with one of the relays and lying in the locus of the movable contact at the relative speed of the governors corresponding to the gear ratio engageable upon energization of the said one of the relays.

24. The combination with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, and a distributor movable two-dimensionally by the two governors jointly to enable the engagement by said gear train engaging means of any gear train when the peripheral speeds of the engaging parts thereof attain substantial synchronism but only as the speed ratio afforded thereby is appropriate to the ratio of the driving and driven members, and pre-selector means disposed between said distributor and said gear train engaging means to determine the gear ratio to be engaged.

25. The combination, with a change speed gear having a driving member, a driven member, a plurality of gear trains affording different speed ratios between said members, and means selectively engaging said gear trains one at a time, of a governor driven at a rotational speed which is a constant proportion of the speed of the driving member, another governor driven at a rotational speed which is a constant proportion of the speed of the driven member, said governors being disposed for rotation about parallel axes and each actuating a collar slidable on its axis, a plurality of electrical solenoids associated with said gear engaging means, a fixed surface carrying a plurality of exposed conductive strips connected one to the winding of each of said solenoids, a cross link articulated to the sliding collars of said governors, an arm extending angularly from said cross link and carrying an electrical contact movable two-dimensionally over said surface by the two governors jointly to engage said strips and energize the windings of said solenoids one at a time, and pre-selector means in circuit with said contact and said solenoid windings determining the solenoid winding to be energized.

26. The combination, with a change speed gear having a driving member, a driven member, a plurality of gear trains affording different forward speed ratios between said members, a gear train affording a reverse speed ratio between said members, means selectively engaging said gear trains one at a time, a clutch associated with the driving member and lever means operable to disengage the clutch and free the driving member from driving torque, of a governor driven at a rotational speed which is a constant proportion of the speed of the driving member, another governor driven at a rotational speed which is a constant proportion of the speed of the driven member, a plurality of electrical solenoids having their armatures connected with the gear engaging means, two parallel plane members affording spaced, opposed surfaces, one of said surfaces comprising a single exposed electrical conductor and the other of said surfaces comprising a number of exposed electrical conductors equal to the number of forward speed ratios, the distributor comprising two electrical contacts resiliently supported and pressed apart against said surfaces, the distributor being movable over said surfaces two-dimensionally under the joint control of the two governors, a pre-selector device consisting of a plurality of pairs of contacts and an electrical switch actuable to bridge said pairs of contacts one at a time, each of the pairs of contacts being connected respectively to the winding of one of the solenoids and to one of the conductors, that conductor comprised alone in its surface lying at the locus of the movable contact at the relative speed of the governors corresponding to the reverse gear ratio and the conductors comprised in the other surface lying in the loci of the movable contact at the relative speeds of the governors corresponding to the forward gear ratios engaged by the energization of the several solenoids through said conductors, and means maintaining any gear engaged, said last mentioned means being releasable on the actuation of said lever means.

27. A combination, with a change speed gear having a driving member, a driven member, a plurality of gear trains affording three forward speed ratios between said members, a gear train affording a reverse speed ratio between said members, two gear striker forks each slidable in two directions from a neutral position and a lever universally pivoted and movable selectively to slide one of said forks and engage one of said gear trains, of a governor driven at a rotational speed which is a constant proportion of the speed of the driving member, another governor driven at a rotational speed which is a constant proportion of the speed of the driven member, a tandem pair of electrical solenoids having a common armature connected with the lever, two plane members presenting parallel opposed surfaces one of which comprises a single exposed conductive strip and the other of which comprises three exposed conductive strips, a distributor comprising a pair of electrical contacts resiliently supported and pressed apart against said parallel surfaces, said distributor being movable two-dimensionally under the joint control of the two governors, and means determining the engagement of the lever with a selected one of the striker forks, two of the conductors in that surface which comprises three conductors being in parallel in circuit with the winding of one of the solenoids and lying in the loci of the movable contact at the relative speeds of the governors corresponding to the forward speed ratios engageable upon energization of the said one of the solenoids under the selective engagement of the lever with the striker forks, and the remaining conductor comprised in the last mentioned surface together with the single conductor comprised in the opposed surface being in parallel in circuit with the winding of the other solenoid and lying in the loci of the movable contact at the relative speeds of the governors corresponding respectively to the forward speed ratio and the reverse speed ratio engageable upon energization of the said other solenoid under the selective engagement of the lever with the striker forks.

JAMES PATERSON.
JOSEPH HOWARD PATERSON.